J. L. JONES.
POWER TRANSMITTING MECHANISM.
APPLICATION FILED SEPT. 1, 1905.
944,240.
Patented Dec. 21, 1909.
2 SHEETS—SHEET 2.
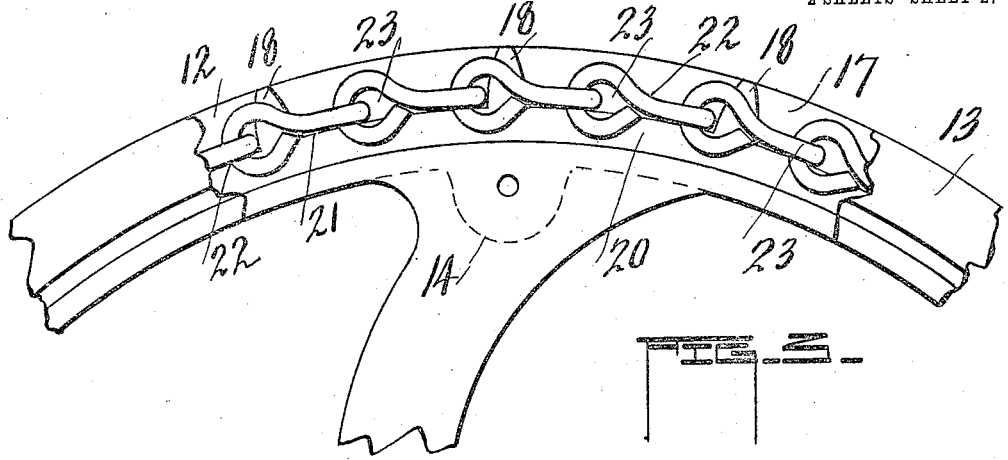
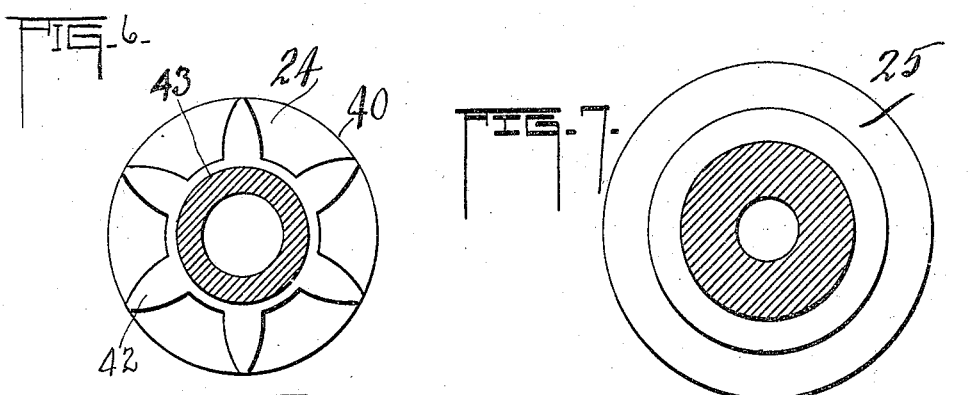
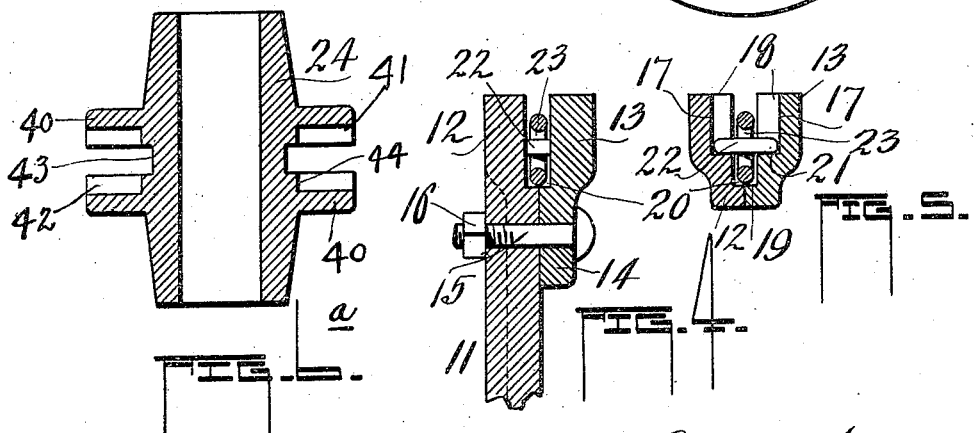
Witnesses:
J. O. Bailey.
R. B. LaPorte.
Inventor,
John L. Jones.
By Chas. W. LaPorte
Atty.

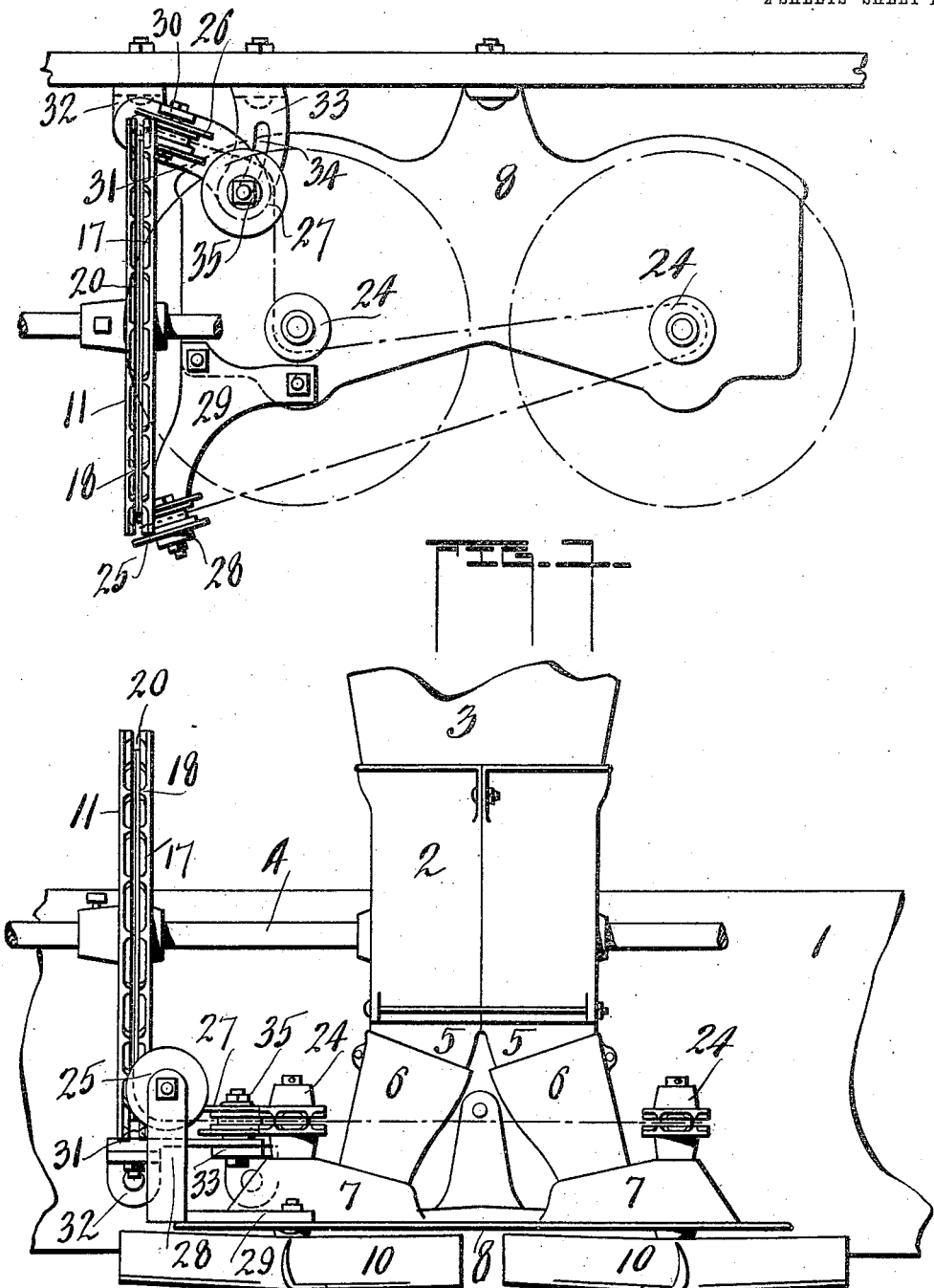

UNITED STATES PATENT OFFICE.

JOHN L. JONES, OF PEORIA, ILLINOIS.

POWER-TRANSMITTING MECHANISM.

944,240.  Specification of Letters Patent.  Patented Dec. 21, 1909.

Application filed September 1, 1905. Serial No. 276,744.

*To all whom it may concern:*

Be it known that I, JOHN L. JONES, a citizen of the United States, residing at Peoria, in the county of Peoria and State of Illinois, have invented certain new and useful Improvements in Power - Transmitting Mechanism; and I do hereby declare that the following is a full, clear, and exact description of the invention, which will enable others skilled in the art to which it appertains to make and use the same.

This invention has reference to a power transmitting mechanism wherein the driving element between the driving and the driven shaft or shafts is a chain, the links of which are provided with eyes disposed at right angles to each other and the said links connected by looping the eyes of adjacent links through each other.

A further object of the invention is a driving mechanism applicable to broad cast seeding machines and other devices wherein it is adapted to transmit power from a driving to a driven shaft or shafts which are disposed at right angles to each other. The driving and driven wheels having their peripheries provided with circumferential channels or grooves in which are disposed teeth which are arranged in pairs opposite to each other to leave an open space between the same, and an annular groove or depression extending down into the rim or the body of said wheels in width to correspond to the distance between the teeth aforesaid and merging into the said circumferential groove. A driving chain between the driving and the driven wheels, the same consisting of links having eyes disposed at right angles to each other and the said links looped through the eyes of adjacent links and adapted, in engaging the wheels aforesaid, to have one of their eyes lie flatwise in the circumferential grooves of the wheels and the eyes thereof disposed at right angles having portions movable through the annular groove aforesaid of the said wheels.

The invention has for its further object a chain drive adapted for use on broad cast seeding machines, or machines where it is desired to transmit motion from a driving to a driven shaft or shafts disposed at right angles to each other; wherein a chain is used for transmitting power which consists of a series of links having a pair of eyes disposed at right angles to each other and of such a nature that the said chain may be carried from the driving wheel at right angles over or under idlers and around the driven wheel or wheels.

For a further and full description of the invention herein and the merits thereof, and also to acquire a knowledge of the details of construction of the means for effecting the result, reference is had to the following description and the drawings hereto attached.

While the essential and characteristic features of the invention are susceptible of modification, still the preferred embodiment of the invention is illustrated in the accompanying drawings, in which:—

Figure 1 is a plan view illustrating the arrangement of a driving wheel carried on a driving shaft; a driven wheel or wheels carried by a driven shaft or shafts disposed at right angles to the driving shaft; idler wheels and suitable supports therefor, and in dotted lines the representation of a chain transmitting motion from the driving to the driven wheel or wheels. Fig. 2 is a front elevation of the driving shaft, the driving wheel, the driven wheel or wheels and the idler wheels illustrated in Fig. 1, and showing the same as applied to a broad cast seeding machine. Fig. 3 is a detail of a portion of the rim of the driving wheel, the rim broken away to show the disposition of a drive chain when the same is co-acting therewith. Fig. 4 is a sectional detail through the rim of the wheel shown in Fig. 3 and at a point where the teeth occur therein, also showing in section, the driving chain shown in Fig. 3. Fig. 5 is a cross section through the rim of the wheel shown in Fig. 3 at a point intermediate the teeth thereof, also showing the driving chain seen in Fig. 3. Fig. 6 is a longitudinal cross section through one of the wheels carried by the driven shafts; Fig. 6ª is a transverse cross section through the same wheel; Fig. 7 is a sectional view through one of the idler wheels.

Like numerals of reference indicate corresponding parts throughout the figures.

In the drawings, in Fig. 2, I have illustrated the driving mechanism as applied to a broad cast seeding machine, this is the preferred application of my invention, although it will be readily seen that the invention need not necessarily be limited to use on a broad cast seeding machine. However, that the invention may be the better understood, it is described in that connection, wherein 1 denotes an endgate to which may be attached suitable seeding devices consisting of the casing 2 supporting the hopper 3. The casing adapted to contain suitable force-feeding mechanism, not shown, which is adapted to be driven by means of a driving shaft 4 deriving its power from some suitable mechanism. In this instance, from the casing depend two short spouts 5 to which are pivotally connected the diverging spouts 6, which at their lower ends, communicate with hopper portions 7 of a suitable shield 8 adapted to be supported by the end gate 1. In the hopper portions of the shield 8, is journaled a pair of short vertical driven shafts 9, separated at suitable distances apart and on the lower ends of said shafts and beneath the shield 8 is carried distributing fans 10.

No attempt has been made to show any particular form of broad cast seeding mechanism, the feed thereof nor the manner of supporting the same on the endgate, as these devices are well known to the trade and have substantially the appearance of that shown in Fig. 2, and it is not thought that further description is necessary.

Referring particularly to the driving or power transmitting mechanism for imparting movement to the fans 10, through the fan shafts 9 and from the driving shaft 4, 11 indicates a wheel provided with the usual hub portion, by means of which the same may be attached to the driving shaft and to which are connected spokes supporting a rim. The rim of the driving wheel 11 consists of the portion 12 integral with the spokes of the said wheel and an annular ring 13 conforming substantially to the rim portion 12 and secured thereto by means of lips 14 depending from the ring 13 and coinciding with the spokes of the said wheel to which they are suitably connected by means of the bolts 15 and the nuts 16, see Fig. 4.

The object of making the rim of the driving wheel with a ring portion separate therefrom and which is adapted to be secured thereto, is, that with the construction of the driving wheel as will be further explained, the casting of the said wheel may be more conveniently done when making the rim portion substantially as here shown. The matching faces of the rim portion 12 and the ring 13 have the annular cut-out portions 17, which are broken at intervals by the interposition of teeth 18 which are integral with the said ring and rim portions of the wheel and separated from each other as shown in the figures. The ring and rim portions of the said wheel are further provided with the reduced annular cut-out portions 19, forming an annular groove 20 in width to correspond to the space between the teeth 18 aforesaid; and where the annular groove 20 of the said wheel merges into the annular cut-out portion 17, there is provided the shoulder portions 21. The driving chain, to which reference has been made, consists of a series of links 22 provided with the eyes 23 disposed at right angles to each other and in which the eyes of the adjacent links are looped. This chain is known as a jack-chain or one wherein the links are referred to, as twisted links. In traveling over the driving wheel and through the grooves formed in the rim of the wheel, or rim and ring portions thereof, one of the eyes 23 of each of the links will seat itself on the shoulder portion 21 of the said rim 12 and the ring 13 of the wheel and between the walls of the annular cut-out portions 17; and the opposite eyes 23 of the said links will seat themselves edgewise in the annular groove 20 thereof, at points intermediate the teeth and at other points coinciding with the said teeth and between the matching faces thereof. The teeth 18 are arranged in pairs facing each other and the eyes of the said links, when traveling over the driving wheel, are alternately disposed. That is to say, the connecting eyes of the adjacent links will engage the said wheel so that the eye of one link will rest on the shoulder portions 21 and the connecting eye of the opposite link will be disposed edgewise in the annular groove 20.

The driven wheels, best seen in Figs. 6 and 6ᵃ, which are carried on the upper end of the driven shafts 9, are indicated as 24 and are similar to the driving wheel only they are made in one piece, and the two rings or flanged portions of the hub are integral therewith. These rings or flange portions are indicated as 40 and united are similar to the rim portion 12 and the rim 13 of the driving wheel. Their matching faces have the annular cut out portions 41, which are broken at intervals by the interposition of teeth 42, which are integral with said flanges and separated from each other, as shown in Fig. 6. Said ring portion of the driven wheels are further provided with the reduced annular cut out portion 43 and where the annular cut out portion merges into the cut out portions 41, there is provided the shoulder portion 44. The pinions constructed as above described are capable of receiving and do receive the links of the driving chain, substantially in the same manner in which said links are received by corresponding portions in the rim of the driving wheel, so that it is not thought necessary to further show or describe the application of the driving chain to the pinions 24.

I employ a series of idler wheels 25, 26 and 27, each of which is constructed substantially as seen in the figures, appearing somewhat as do the drive and driven wheels with the exception that the teeth are omitted. The idler wheel 25 is revolubly attached to an ear 28 of a bracket 29 bolted or otherwise suitably secured to the shield 8 or some other support. It is intended that the bracket 29 shall have a fixed position, but this is not absolutely necessary and the same be adjustably supported, or the idler 25 adjustably supported on said bracket 29. The position of the idler wheel 25 is such that the driving chain, as it comes over the driving wheel 11, may leave the driving wheel at right angles, substantially as seen in dotted lines in Fig. 2, travel around the said idler 25, to and around the driven wheel 24 on the driven shaft 9 at the far side of the machine and from the wheel 24 just specified, around the driven wheel 24 on the driven shaft 9 which is nearest to the driving wheel; to and around the idler 27 which is horizontally disposed and under and around the idler wheel 26 from which the said chain is directed to and over the driving wheel. The position of the idler wheel 26 is substantially similar to the idler wheel 25 and is so disposed with reference to the driving wheel, that the driving chain may leave the same at right angles and be directed up and over the said driving wheel.

I am aware that it is not new to transmit power from one shaft to another, where the same are disposed at right angles, and particularly by means of a belt or some other flexible connection. But I am not aware of the employment of a chain, wherein a chain is used which is adapted to leave a driving wheel at right angles and be directed to the driven wheels, nor wherein the same may leave an idler wheel at right angles and be directed to the driving wheel, substantially as herein shown. And it is only by reason of the application of a chain having a construction substantially as herein illustrated, that it is practical to apply such a drive.

I have provided for swinging the idler 27 to take up any slack in the chain, which adjustment, to some extent, will swing the idler 26. I accomplish this in the following manner: The idler 26 is revolubly attached to an ear 30 extending up from a bracket 31, which at one end, is pivotally secured to a support 32 attached to the endgate 1. The pivot of the bracket 31 to the support 32 is in a vertical plane beneath the pitched line of the chain, as it leaves the idler to be directed on or to engage the driving wheel 11. The forward end of this bracket 31 is slidably carried on a bracket 33 extending out from and suitably secured to the endgate 1. The bracket 33 has an elongated slot 34 struck on an arc of a circle whose center is the center of the pivotal connection between the bracket 31 and the support 32. The idler 27 is revolubly carried on the bracket 31 and the spindle which supports the said idler is carried down through the same, the bracket 31 and the slot 34 of the bracket 33 and a nut 35 engaging a threaded end of the spindle of the said idler is employed for retaining the idler 27 and the bracket 31 in adjusted positions on the bracket 33. Thus, through the supports of the idlers 26 and 27 and the connections thereof as described, I am enabled to adjust the idler 27 without interfering with the direction of travel of the chain from the said idler to the idler 26, nor do I re-arrange the position of the idler 26, which would prevent the chain as it leaves the same, to go over the driving wheel, in a direction at right angles from the said idler.

Having thus fully described my invention, what I claim and desire to secure by Letters Patent of the United States, is:—

1. In a device of the character described, the combination of a driving shaft and a driving wheel, a driven shaft and a driven wheel, the driving and driven shafts disposed at right angles to each other, a chain connecting the said driving and driven wheels, a pair of idler wheels, one to receive the chain from the driving wheel and the other for delivering the same thereto, a supplemental idler wheel disposed between the delivering idler and the driven wheel, the receiving and delivering idlers positioned so as to adapt the chain to leave the driving wheel and delivering idler wheel at right angles and an adjustable support for the said delivering and supplemental idler wheels.

2. In a device of the character described, the combination of a driving shaft and a driving wheel, a driven shaft and a driven wheel, the driving and driven shafts disposed at right angles to each other, a chain connecting the said driving and driven wheels, a pair of idler wheels, one to receive the chain from the driving wheel and the other for delivering the same thereto, a supplemental idler wheel disposed between the delivering idler and the driven wheel, the receiving and delivering idlers positioned so as to adapt the chain to leave the driving wheel and delivering idler wheel at right angles, a pivotal support adapted to carry the delivering and supplemental idlers, and a guide for the forward end of the said support.

3. In a device of the character described, the combination of a driving shaft and a driving wheel, a driven shaft and a driven wheel, a chain connecting the said driving and driven wheels, said chain composed of a series of interlooped twisted links, a pair of idler wheels, one to receive the chain from the driving wheel and the other for delivering the same thereto, a supplemental idler wheel disposed between the delivering idler and the driven wheel, the receiving and delivering idlers positioned so as to adapt the chain to leave the driving wheel and delivering idler wheel at right angles, a pivotally supported bracket upon which the delivering idler is supported, the pivot of the said bracket being in a vertical plane beneath the point at which the chain leaves the idler to engage the driving wheel.

4. In a device of the character described, the combination of a driving shaft and a driving wheel, a driven shaft and a driven wheel, the driving and driven shafts disposed at right angles to each other, a chain connecting the said driving and driven wheels, an idler for receiving the chain from the driving wheel and directing it to the driven wheel, an idler for receiving the chain from the driven wheel and delivering the same to the driving wheel, and a pivoted bracket supporting the delivering idler, the pivot of said bracket being in a vertical plane beneath the point at which the chain leaves the delivering idler to engage the driving wheel.

5. In a device of the character described, the combination of a driving shaft and a driving wheel, a driven shaft and a driven wheel, the driving and driven shafts disposed at right angles to each other, a chain connecting the said driving and driven wheels, an idler for receiving the chain from the driving wheel and directing it to the driven wheel, an idler for receiving the chain from the driven wheel and delivering the same to the driving wheel, a supplemental idler wheel between the delivering idler and the driven wheel, a pivotally arranged bracket supporting at opposite ends the delivering and supplemental idlers, the pivot of said bracket being in a vertical plane beneath the point at which the chain leaves the delivering idler to engage the driving wheel, and means for adjusting the forward end of said bracket and securing it.

6. In a device of the character described, the combination of a driving shaft and a driving wheel thereon, a driven shaft and a driven wheel thereon, said shafts rotating in planes at right angles to each other, continuous connecting means positively connecting the driving and driven wheels, a pair of idlers adapted to direct the connecting means from and to the driving wheel at right angles, said idlers having a separate mounting and rotating in a plane beneath the point at which said connecting means leave and engage the said driving wheel.

7. In a device of the character described, the combination of a driving shaft and a driving wheel thereon, a driven shaft and a driven wheel thereon, said shafts rotating in planes at right angles to each other, continuous connecting means positively connecting said driving and driven wheels, an idler rotating on a horizontal axis and beneath the point at which said connecting means leaves the driving wheel whereby the same may leave the driving wheel at right angles, and a second idler also rotating on a horizontal axis and beneath the point at which said connecting means engages the driving wheel whereby the same may leave said second idler at right angles, said idlers having separate mountings and disposed in proximity to the periphery of said driving wheel.

8. In a device of the character described, the combination of a driving shaft and a driving wheel thereon, a driven shaft and a driven wheel thereon, said shafts rotating in planes at right angles to each other, continuous connecting means positively connecting said driving and driven wheels, an idler rotating on a horizontal axis and beneath the point at which said connecting means leave the driving wheel whereby the same may leave the driving wheel at right angles, a second idler also rotating on a horizontal axis, but independent of the axis of said first mentioned idler, and beneath the point at which said connecting means engages the driving wheel whereby the same may leave the said idler at right angles, and a supplemental idler disposed between the delivering idler and said driven wheel.

In testimony whereof I affix my signature, in presence of two witnesses.

JOHN L. JONES.

Witnesses:
   CHAS. W. LA PORTE,
   ROBT. N. MCCORMICK.